(12) United States Patent
Lee (10) Patent No.: US 10,265,880 B2
(45) Date of Patent: Apr. 23, 2019

(54) HAND SAW MACHINE WITH ENVIRONMENT CONTROL DEVICE

(71) Applicant: Chao-Ying Lee, Riverside, CA (US)

(72) Inventor: Chao-Ying Lee, Riverside, CA (US)

(*) Notice: Subject to any disclaimer, the term of this patent is extended or adjusted under 35 U.S.C. 154(b) by 0 days.

(21) Appl. No.: 15/638,280

(22) Filed: Jun. 29, 2017

(65) Prior Publication Data

US 2019/0001520 A1    Jan. 3, 2019

(51) Int. Cl.
*B27G 19/04* (2006.01)
*B23D 51/04* (2006.01)
*B27B 9/04* (2006.01)

(52) U.S. Cl.
CPC .......... *B27G 19/04* (2013.01); *B23D 51/04* (2013.01); *B27B 9/04* (2013.01)

(58) Field of Classification Search
CPC ...... B23D 47/12; B23D 59/006; B23D 1/047; B27B 9/02; B27B 9/00; A47L 5/365; A47L 9/102; B23Q 11/006; B23Q 11/0046; B23Q 17/2406; Y10T 83/207; Y10T 83/8773; Y10T 83/04; Y10T 83/828; Y10T 83/7734; B28D 1/044; B28D 7/02; B27G 19/04

USPC .......... 30/389, 374, 388, 390, 519, 391, 520, 30/123.3, 124, 376, 377; 83/581, 100, 83/162, 98, 165–167, 520, 478, 99, 169
See application file for complete search history.

(56) References Cited

U.S. PATENT DOCUMENTS

| 7,020,970 B1 * | 4/2006 | Welch | B27G 19/04 30/391 |
| 7,275,326 B2 * | 10/2007 | Tanimoto | B23D 59/006 30/123.3 |
| 2004/0149107 A1 * | 8/2004 | Lee | A47L 5/365 83/581 |

* cited by examiner

*Primary Examiner* — Ghassem Alie
(74) *Attorney, Agent, or Firm* — Raymond Y. Chan; David and Raymond (57) ABSTRACT

A hand saw machine with environment control device includes a motor assembly, a cutting tool for cutting a work piece and driven to rotate by the motor assembly, and an environment control device connected to the motor assembly, wherein the environment control device includes an air intake hood sheltering the motor assembly from residual particles ejected by the work piece during cutting, wherein the hand saw machine further has an air passage formed by the environment control device and the motor assembly.

27 Claims, 7 Drawing Sheets

HAND SAW MACHINE WITH ENVIRONMENT CONTROL DEVICE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a hand saw machine, and more particularly to a saw machine with an environment control device which is easy to adopt that improves the quality of air sucked into the motor, thereby extending its life and improving cooling thereof.

Description of Related Arts

A conventional hand saw machine is used for cutting items such as ceramic, stone, concrete, wood, and/or metal materials. The conventional hand saw machine is also used in different environment. The conventional hand saw machine includes a rotatable cutting member. When the cutting member cuts the items, as the rotation speed of the cutting member is fast, the cutting member is easy to eject residual particles from the surface of the cut items with contaminating air sucked inside the conventional hand saw machine. As a result, the residual particles may block inside of the conventional hand saw machine and reduce the life span of the conventional hand saw machine.

Another disadvantage of the conventional hand saw machine has a poor cooling effectiveness. The conventional hand saw machine includes a motor driving the cutting member to rotate. During the cutting process of the cutting member, the motor generates a large quantity of heat which is concentrate around the motor, thereby reducing cooling effectiveness and damaging the motor, even the whole conventional hand saw machine has a reduced life span.

A current improved conventional hand saw machine provides a ventilation opening in order to improve the cooling effectiveness. In addition, in order to obtain a better cooling effectiveness, the area ventilation opening is enlarged. Although the cooling effectiveness current improved conventional hand saw machine is enhanced to some extent, however, the ventilation opening for dissipation increases exposure of particle to the motor, causing more residual particles being ejecting into the current improved conventional hand saw machine, thereby reducing the life span of the motor and may reducing the cooling effectiveness in return.

SUMMARY OF THE PRESENT INVENTION

The invention is advantageous in that it provides a hand saw machine with environment control device, which improves the quality of air sucked into the motor and the environment control device is easy to adapt, thereby extending the life of the saw machine and improving cooling thereof.

Another advantage of the invention is to provide a hand saw machine with environment control device, which is able to prolong the service life span of the hand saw machine.

Another advantage of the invention is to provide a hand saw machine with environment control device, which provides an air passage within the environment control device and the motor assembly and promotes heat dissipation, thereby prolonging the service life span of the hand saw machine.

Another advantage of the invention is to provide a hand saw machine with environment control device, which provides an environment control device promoting heat dissipation and prolonging the service life span of the hand saw machine.

Another advantage of the invention is to provide a hand saw machine with environment control device, which provides an air intake hood sheltering the motor assembly from residual particles ejected by the work piece during cutting.

Another advantage of the invention is to provide a hand saw machine with environment control device, which provides a cooling fan improving the cooling effectiveness of the hand saw machine.

Another advantage of the invention is to provide an environment control device, for being assembled on a hand saw machine, which provides an air passage and promotes heat dissipation of the hand saw machine, thereby prolonging the service life span of the hand saw machine.

Additional advantages and features of the invention will become apparent from the description which follows, and may be realized by means of the instrumentalities and combinations particular point out in the appended claims.

According to the present invention, the foregoing and other objects and advantages are attained by a hand saw machine with environment control device, comprising:

a motor assembly, a cutting tool for cutting a work piece and driven to rotate by the motor assembly, a handheld device comprising one or more lifting handle for hand holding the hand saw machine; and an environment control device connected to the motor assembly, wherein the environment control device comprises an air intake hood sheltering the motor assembly from residual particles ejected by the work piece during cutting, wherein the hand saw machine further has an air passage formed by the environment control device and the motor assembly.

According to the present invention, the foregoing and other objects and advantages are attained by an environment control device, for being assembled on a hand saw machine cutting a work piece, comprising an air intake hood sheltering a motor assembly of the hand saw machine from residual particles ejected by the work piece during cutting, wherein the air intake hood and the motor assembly forms an air passage.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Referring to FIG. 1 to FIG. 7 of the drawings, a hand saw machine with environmental control arrangement according to a preferred embodiment of the present invention is illustrated, wherein the hand saw machine equipped with an environmental control arrangement 40 comprises a handheld device which comprises a rear lifting handle 10 and a front lifting handle 11 for hand holding the hand saw machine, a motor assembly 20, a cutting tool 31, and a mechanical link arrangement 30 connected the motor assembly 20 with the cutting tool 31.

Figure 1:
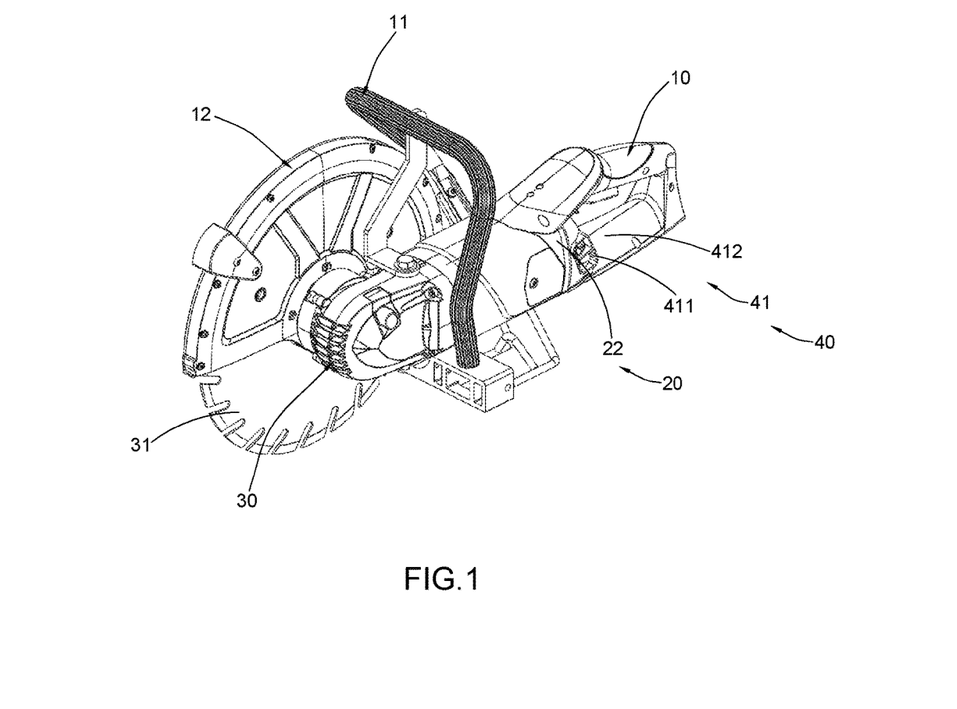
FIG. 1 is a perspective view of a hand saw machine with environment control device according to a preferred embodiment of the present invention.
Figure 2:
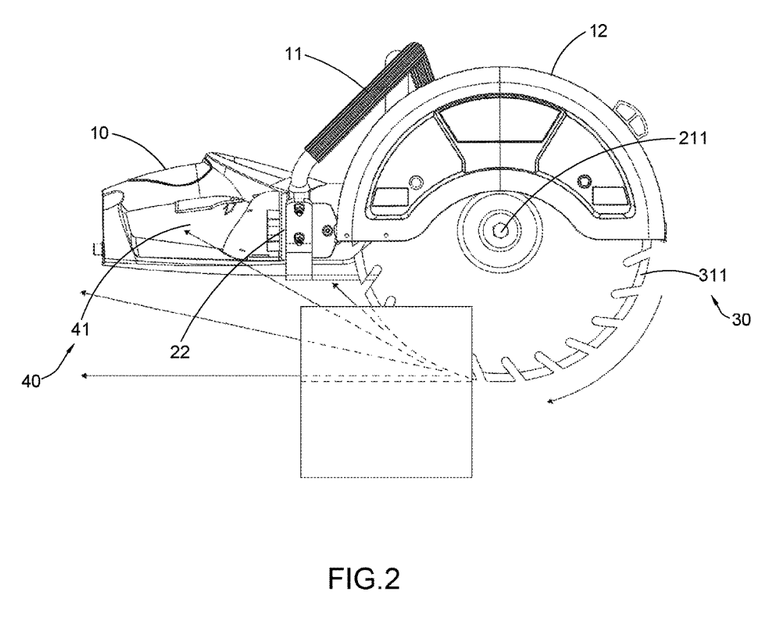
FIG. 2 is a side view of the hand saw machine with environment control device according to the preferred embodiment of the present invention, illustrating motor proximity to the ejected residual particles from the work piece.

The hand saw machine with environmental control arrangement 40 is adapted for sawing a variety of work piece. The real lifting handle 10 and the front lifting handle 11 are arranged on real and front of the hand saw machine with environmental control arrangement. In this preferred embodiment, the real lifting handle 10 is connected with the environment control device 40 and the motor assembly 20. The front lifting handle 11 is coupled with the motor assembly 20. According to different directions of force application and different shapes of the work piece, the user holds the real lifting handle 10 or the front lifting handle 11 of the hand saw machine with environmental control arrangement to obtain adaptable and effective operation effects. In other embodiment of the present invention, the real lifting handle 10 and the front lifting handle 11 are able to be implemented with adjustable directions. For example, in other embodiment, the front lifting handle 11 further comprises a main handle portion, a ratable portion connected with the main handle portion, so that the handling direction of the front lifting handle 11 is adjustable, thereby the cutting position of the hand saw machine is adjustable.

One skilled in the art will understand that the hand saw machine with environmental control arrangement are able to be assembled with one, two or more lifting handles and the described above is exemplary only and not intended to be limiting. Accordingly, the handles of the hand saw machine of the present invention enable the hand saw machine to be lifted by hand into the desired cutting position so that the exposed cutting tool cuts the work piece.

Specifically, the motor assembly 20 comprises a driving motor 21, a driving shaft 211 being driven to be rotated by the driving motor 21 and a motor case 22 receiving the driving motor 21.

In a further, the cutting tool 31 of the hand saw machine with environment control device is coaxially mounted to the driving shaft 211 and is driven to be rotated with the driving shaft 211. In other words, the driving shaft 211 is driven to be rotated by the drive motor 21 and the cutting tool 31 is coaxially connected to the driving shaft 211, so that the cutting tool 31 is driven to be rotated by the drive motor 21.

More specifically, the drive motor 21 is axial positioned to be perpendicular to the drive shaft 211 and the cutting tool 31 has a cutting area 311 defined at an outer circumferential portion thereof when the cutting tool 31 cuts the work piece.

The environment control device 40 of the hand saw machine further comprises an air intake hood 41 that shelters the motor assembly 20 from residual particles ejected by the work piece during cutting. The hand saw machine with the environment control device 40 further has an air passage formed between the circumferential wall of the motor case 22 and the circumferential wall of the air intake hood 41.

The air intake hood 41 comprises an air intake hood body 412 and has an air intake hood window 411 defined by the air intake hood body 412. The motor case inlet 221 of the motor case 22 is communicated with and the air intake hood window 411. In addition, the driving motor 21 is positioned closely to the motor case inlet 221 of the motor case 22.

Moreover, the motor assembly 20 further comprises a cooling fan 23 rotatably connected to the driving motor 21.

More specifically, the motor case 22 of the motor assembly 20 further has an motor case outlet 222 at another opposed side corresponding to the motor case inlet 221 to define a motor cavity 223 to receive the driving motor 21, and the cooling fan 23 is rotatably connected to the driving motor 21 within the motor cavity 223, so that when the cooling fan 23 is driven to rotate by the driving motor 21, the cooling fan 23 sucks in air though the motor case inlet 221 of the motor case 22 and discharges the air through the motor case outlet 222.

Figure 3:
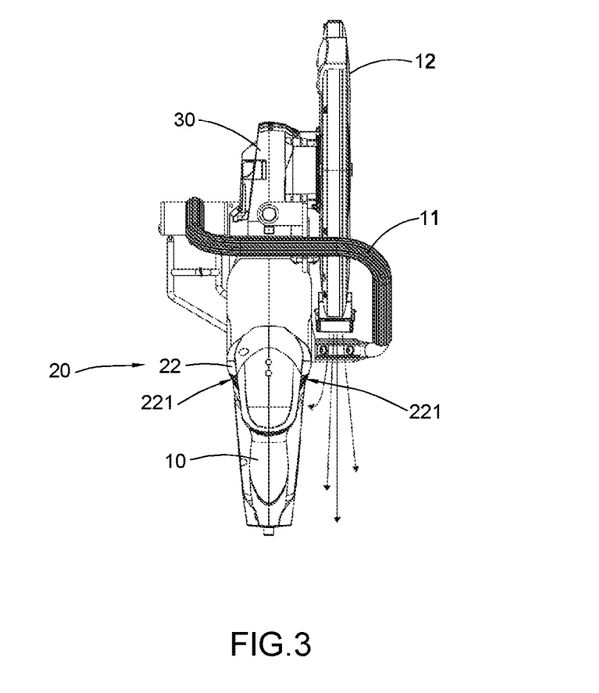
FIG. 3 is a top view of the hand saw machine with environment control device to illustrate proximity of residual particles predictably ejected from the cutting tool.

As shown in FIG. 3 of the drawings, the motor case 22 of the motor assembly 20 has a motor case inlet 221 which is toward closely to the cutting tool 31. When the cutting tool 31 cuts the work piece, the cutting tool 31 is easy to eject residual particles from work piece contaminating air sucked into motor case inlet 221, thereby increasing exposure of particle to the drive motor 21, so as to cause damage to the motor assembly 20 and reducing cooling effectiveness, therefore it is beneficial to suck air from the opposing side of the motor assembly 20 using the preferred embodiment of the environment control device 40.

Figure 4:
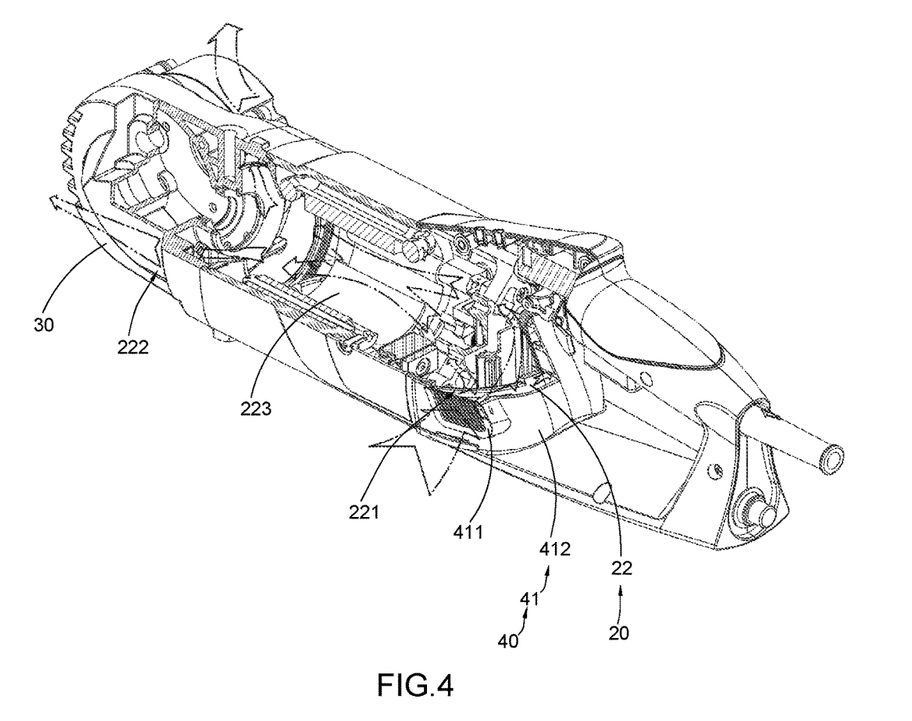
FIG. 4 is a sectional perspective view of a motor assembly of the environment control device of the hand saw machine according to the above preferred embodiment of the present invention, illustrating the directions of the intake fresh air and the discharged hot air without the sucking motor.

More specifically, as shown in FIG. 4 of the drawings, direction of air suction is illustrated in this detailed sectional drawing of the motor assembly 20, with the cooling fan 23 and the driving motor 21 removed from the motor cavity 223, wherein to mainly illustrate the fresh air is sucked first through the air intake hood window 411, entering the motor cavity 223 from the motor case inlet 221 and discharged from the motor case outlet 222 dissipating heat from the driving motor 21, so as to prolong the service life span thereof.

More specifically, when the cutting tool 31 cuts the work piece and the cooling fan 23 is driven to rotate by the driving motor 21, the air outside of the hand saw machine is sucked through the air intake hood window 411, the motor case inlet 221, the motor cavity 223 and the motor fan 23 in sequence, and is finally discharged from the motor case outlet 222, thereby forming the air passage of the hand saw machine. In other words, the air passage of the hand saw machine is formed between the circumferential wall of the motor case 22 and the circumferential wall of the air intake hood 41. Although the motor case inlet 221 is positioned closely to the cutting tool 31 and even through residual particles of the work piece are sucked into the motor case inlet 221 when the cutting tool 31 cuts the work piece, the entered residual particles is rapidly discharged outside through the air passage, thereby decreasing exposure of residual particle to the drive motor 21, so as to avoid damage to the motor assembly 20 and to improve cooling effectiveness.

In addition, the air intake hood window 411 is formed on one side portion of the air intake hood body 412 and further reduce the amounts of residual particles entering into the air passage.

Accordingly, the motor assembly 20 and the environmental control arrangement 40 of the hand saw machine provide the air passage and promote air circulation of the hand saw machine, so that not only the cooling effective is improved, but also the residual particles entered into the air passage is more quickly discharged outside, thereby prolonging the life span of the hand saw machine.

Figure 5:
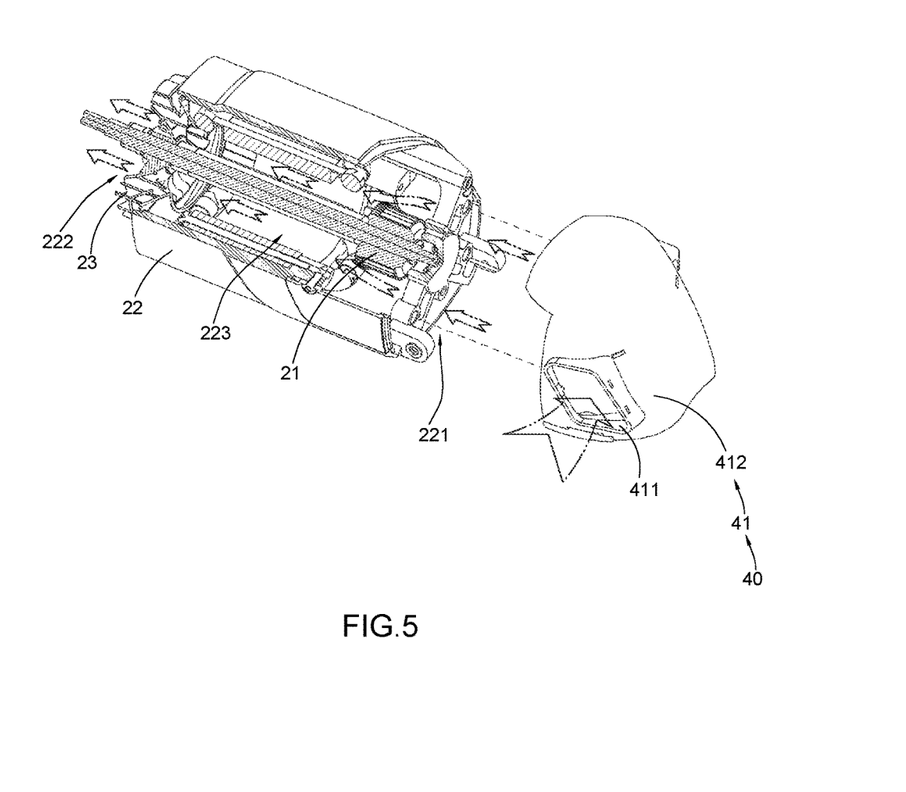
FIG. 5 is a sectional perspective view of a simplified motor assembly illustrating the directions of the fresh air as it is sucked by the cooling fan that is rotatably connected to the driving motor with an embodiment of the preferred embodiment in the not installed position.

As shown in FIG. 5 of the drawings, direction of air suction is illustrated in this detailed sectional drawing of a simplified, but not limited to, the motor case 22 in the motor assembly 20 to demonstrate relationship of the driving motor 21 and the cooling fan 23 within the motor cavity 223, so as to show the direction of fresh air passing there through.

Moreover, an embodiment of the environment control device 40 of the present invention is illustrated to be not installed onto the motor case 22, so as to mainly show an air suction direction there through the motor case inlet 221 in FIG. 5 contrasting with the air suction direction there through the motor case inlet 221 in FIG. 4, and when installed the air suction direction there through the air intake hood window 411 in FIG. 4, by adding an air passage between the circumferential wall of the motor case 22 and the circumferential wall of the air intake hood 41, wherein sheltering the motor case 22 more precisely the motor case inlet 221.

Figure 6:
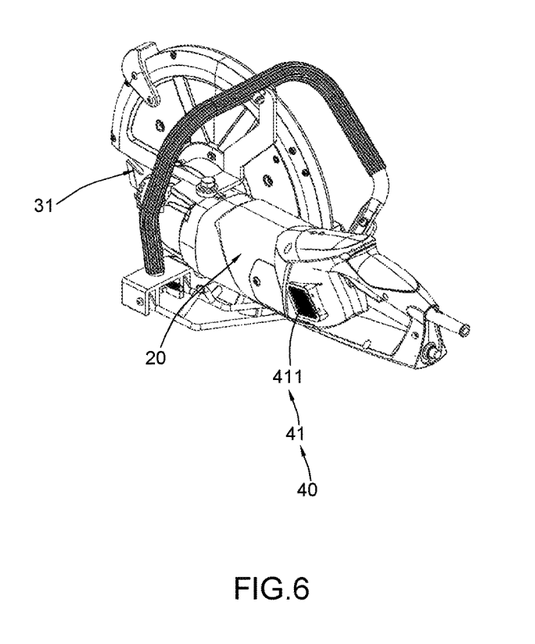
FIG. 6 is a perspective view of an environment control device assembled on a conventional hand saw machine.

As shown in FIG. 6 of the drawings, the preferred embodiment of the present invention of the environment control device 40 is illustrated to be installed, wherein fresh air is communicated to the driving motor 21 via the air intake hood window 411 to the motor case inlet 221 to the motor cavity 223 to cool the driving motor 21.

Figure 7:
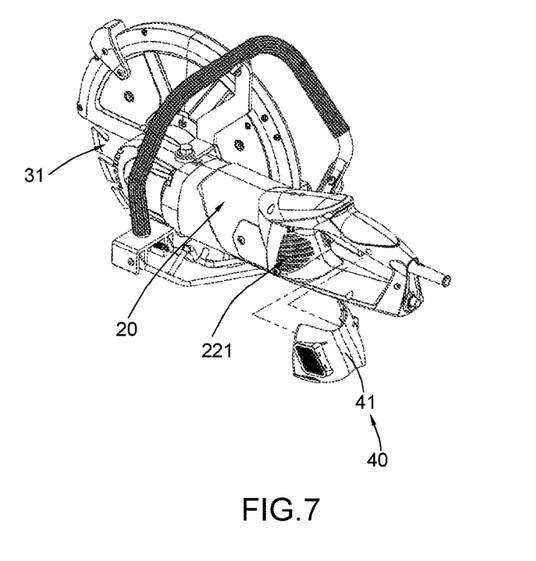
FIG. 7 is a perspective view of a conventional hand saw machine with the preferred embodiment of the present invention in the not installed position.

As shown in FIG. 7 of the drawings, a conventional hand saw machine motor case inlet 221 is to communicate air directly to the motor cavity 223 to cool the driving motor 21, the environment control device 40 is also adapted to assemble with the conventional hand saw machine and to add the air passage, not only improving the cooling effective, but also rapidly discharging the residual particles entered into the air passage outside of the hand saw machine, thereby sucking in air in close proximity to the cutting tool 31 with residual particles ejected by cutting the work piece and prevent damaging the driving motor 21.

In addition, the hand saw machine with environmental control arrangement further comprises a cutting tool guard 12 forming a cutting tool cavity receiving the cutting tool 31. On one hand, as the cutting tool guard 12 shelters the cutting tool 31, thereby preventing users from accidental laceration by the cutting tool 31; on the other hand, during the cutting tool 31 cutting the work piece, the residual particles is blocked by the cutting tool guard 12 so as to prevent being splash throughout. In the preferred embodiment, the cutting tool guard 12 has a semi-circular structure and is mounted on the mechanical link arrangement. One skilled in the art will understand that the shape and position of the cutting tool guard 12 are exemplary only and not intended to be limiting.

In addition, in this preferred embodiment, the real lifting handle 10 is connected to the motor assembly 20 and the environment control device 40.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A hand saw machine, comprising:
    a motor assembly which comprises a driving motor and a motor case having a motor case inlet and a motor case outlet for allowing a flow of air passing from said motor case inlet to said motor case outlet,
    a cutting tool, which is coupled at said motor case outlet of said motor case, for cutting a work piece and driven to rotate by said motor assembly,
    a handheld device comprising one or more lifting handle for hand holding and lifting said hand saw machine to operate thereof and to adjust different angles thereof; and
    an environment control device connected to said motor assembly, wherein said environment control device comprises an air intake hood sheltering said motor assembly from residual particles ejected by the work piece during cutting, wherein said hand saw machine further has an air passage formed by said environment control device and said motor assembly, wherein said air passage communicates between said motor case inlet and said motor case outlet through a circumferential wall of said air intake hood, wherein said driving motor is sheltered by said air intake hood to prevent an exposure of the residual particles when the air passes through said air passage.

2. The hand saw machine, as recited in claim 1, wherein said air intake hood comprises an air intake hood body and has an air intake hood window defined by said air intake hood body to communicate with said motor case inlet.

3. The hand saw machine, as recited in claim 2, wherein said air intake hood window is formed on one side portion of said air intake hood body.

4. The hand saw machine, as recited in claim 1, wherein said motor case inlet and said motor case outlet are formed at two opposite sides of said motor assembly respectively, wherein said motor assembly further has a motor cavity formed between said motor case inlet and said motor case outlet.

5. The hand saw machine, as recited in claim 4, wherein said air intake hood forms an air intake hood window and said air passage of said hand saw machine is defined by said air intake hood window, said motor case inlet, said motor cavity and said motor case outlet.

6. The hand saw machine, as recited in claim 5, wherein said air passage communicates with said motor case inlet and said air intake hood window.

7. The hand saw machine, as recited in claim 1, wherein said motor assembly further comprises a driving shaft being driven to be rotated by said driving motor, wherein said cutting tool is driven to rotate by said driving motor.

8. The hand saw machine, as recited in claim 7, wherein said air passage of said hand saw machine is formed between a circumferential wall of said motor case and said circumferential wall of said air intake hood.

9. The hand saw machine, as recited in claim 7, wherein said motor case of said motor assembly has a motor cavity receiving said driving motor, wherein said motor case inlet and said motor case outlet are formed at two opposite sides of said motor assembly respectively to define said motor cavity.

10. The hand saw machine, as recited in claim 9, wherein said air intake hood forms an air intake hood window and said air passage of said hand saw machine is defined by said air intake hood window, said motor case inlet, said motor cavity and said motor case outlet.

11. The hand saw machine, as recited in claim 9, wherein said driving motor is positioned closely to said motor case inlet of said motor case.

12. The hand saw machine, as recited in claim 9, wherein said air intake hood is positioned closely to said motor case inlet of said motor case.

13. The hand saw machine, as recited in claim 7, wherein said cutting tool of said hand saw machine with environment control device is coaxially mounted to said driving shaft and is driven to be rotated with said driving shaft.

14. The hand saw machine, as recited in claim 7, wherein said drive motor is axially positioned to be perpendicular to said drive shaft.

15. The hand saw machine, as recited in claim 1, wherein said motor assembly further comprises a cooling fan provided in said air passage.

16. The hand saw machine, as recited in claim 2, wherein said air intake hood is positioned on one side of said air passage and said motor assembly further comprises a cooling fan positioned on other side of said air passage.

17. The hand saw machine, as recited in claim 4, wherein said motor assembly further comprises a cooling fan rotatably connected to said driving motor within said motor cavity.

18. The hand saw machine, as recited in claim 7, wherein said motor assembly further comprises a cooling fan rotatably connected to said driving motor.

19. The hand saw machine, as recited in claim 8, wherein said air intake hood is positioned on one end portion of said motor case and said motor assembly further comprises a cooling fan positioned on other end portion of said motor case.

20. The hand saw machine, as recited in claim 9, wherein said motor assembly further comprises a cooling fan rotatably connected to said driving motor within said motor cavity.

21. The hand saw machine, as recited in claim 10, wherein said motor assembly further comprises a cooling fan positioned closely to said motor case outlet of said motor case, so that when said cooling fan is driven to rotate by said driving motor, said cooling fan sucks in air though said motor case inlet of said motor case and discharges the air through said motor case outlet.

22. The hand saw machine, as recited in claim 11, wherein said motor assembly further comprises a cooling fan positioned closely to said motor case outlet of said motor case, so that when said cooling fan is driven to rotate by said driving motor, said cooling fan sucks in air though said motor case inlet of said motor case and discharges the air through said motor case outlet.

23. The hand saw machine, as recited in claim 12, wherein said motor assembly further comprises a cooling fan positioned closely to said motor case outlet of said motor case, so that when said cooling fan is driven to rotate by said driving motor, said cooling fan sucks in air though said motor case inlet of said motor case and discharges the air through said motor case outlet.

24. The hand saw machine, as recited in claim 1, wherein said hand saw machine with environment control device further comprises a mechanical link arrangement connected said motor assembly with said cutting tool.

25. The hand saw machine, as recited in claim 1, wherein said hand saw machine with environment control device further comprises at least one lifting handle which enables said cutting tool to be lifted by hand into a desired cutting position.

26. The hand saw machine, as recited in claim 1, wherein said hand saw machine with environment control device comprises a rear lifting handle connected with said environment control device and said motor assembly and a front lifting handle coupled with said motor assembly.

27. The hand saw machine, as recited in claim 1, wherein said hand saw machine with environment control device further comprises a mechanical link arrangement connected said motor assembly with said cutting tool.

* * * * *